US011631420B2

United States Patent
Xu et al.

(10) Patent No.: US 11,631,420 B2
(45) Date of Patent: Apr. 18, 2023

(54) VOICE PICKUP METHOD FOR INTELLIGENT REARVIEW MIRROR, ELECTRONIC DEVICE AND STORAGE MEDIUM

(71) Applicant: Beijing Baidu Netcom Science and Technology Co., Ltd., Beijing (CN)

(72) Inventors: Gang Xu, Beijing (CN); Zhengbin Song, Beijing (CN); Danqing Yang, Beijing (CN)

(73) Assignee: APOLLO INTELLIGENT CONNECTIVITY (BEIJING) TECHNOLOGY CO., LTD., Beijing (CN)

(*) Notice: Subject to any disclaimer, the term of this patent is extended or adjusted under 35 U.S.C. 154(b) by 188 days.

(21) Appl. No.: 17/199,161

(22) Filed: Mar. 11, 2021

(65) Prior Publication Data

US 2021/0370836 A1 Dec. 2, 2021

(30) Foreign Application Priority Data

May 29, 2020 (CN) .......................... 202010479034.9

(51) Int. Cl.
*G10L 21/0208* (2013.01)
*H04R 1/40* (2006.01)
(Continued)

(52) U.S. Cl.
CPC .......... *G10L 21/0208* (2013.01); *H04R 1/406* (2013.01); *H04R 3/005* (2013.01); *G10L 2021/02166* (2013.01); *H04R 2430/20* (2013.01)

(58) Field of Classification Search
CPC ........ H04R 1/326; H04R 1/406; H04R 3/005; H04R 29/005; H04R 2201/401;
(Continued)

(56) References Cited

U.S. PATENT DOCUMENTS 6,420,975 B1 7/2002 DeLine et al.
10,645,494 B1 5/2020 Oh et al.
(Continued)

FOREIGN PATENT DOCUMENTS

| CN | 103702452 A | 4/2014 |
| CN | 104057884 A | 9/2014 |

(Continued)

OTHER PUBLICATIONS

Office Action, CN Application No. 202010479034.9, dated May 6, 2021, 7 pages.
(Continued)

*Primary Examiner* — William A Jerez Lora
(74) *Attorney, Agent, or Firm* — Kwan & Olynick LLP (57) ABSTRACT

It is disclosed a voice pickup method and apparatus for an intelligent rearview mirror, an electronic device and a computer readable storage medium which relates to the technical field of vehicle-mounted equipment, and may be used in the field of automatic driving technologies. A voice pickup implementation of the intelligent rearview mirror according to some embodiments includes: acquiring an image of the interior of the vehicle; determining the position of a person in the vehicle with the image of the interior of the vehicle; and adjusting a beamforming direction of a microphone array according to the position of the person in the vehicle.

12 Claims, 4 Drawing Sheets

(51) Int. Cl.
*H04R 3/00* (2006.01)
*G10L 21/0216* (2013.01)

(58) Field of Classification Search
CPC ........ H04R 2201/403; H04R 2201/405; H04R 2430/25; H04R 2430/20; G10L 2021/02166; G10L 21/0208; G10K 11/34
USPC .......................... 381/86, 56, 58, 91, 92, 122
See application file for complete search history.

(56) References Cited

U.S. PATENT DOCUMENTS

| | | | |
|---|---|---|---|
| 10,906,509 B1* | 2/2021 | Turk | G07C 5/0866 |
| 2003/0020603 A1 | 1/2003 | DeLine et al. | |
| 2005/0156753 A1 | 7/2005 | DeLine et al. | |
| 2007/0223732 A1 | 9/2007 | Mao | |
| 2009/0055180 A1* | 2/2009 | Coon | B60R 16/0373 704/251 |
| 2009/0232328 A1 | 9/2009 | DeLine et al. | |
| 2010/0208914 A1 | 8/2010 | Ohtsuka | |
| 2011/0090338 A1 | 4/2011 | DeLine et al. | |
| 2012/0062729 A1 | 3/2012 | Hart et al. | |
| 2012/0182429 A1 | 7/2012 | Forutanpour et al. | |
| 2014/0119567 A1 | 5/2014 | DeLine et al. | |
| 2015/0172842 A1 | 6/2015 | Nakamura et al. | |
| 2015/0237455 A1* | 8/2015 | Mitra | H04S 7/30 381/92 |
| 2021/0044737 A1* | 2/2021 | Kang | G07C 5/008 |
| 2021/0383795 A1* | 12/2021 | Li | G06N 3/044 |

FOREIGN PATENT DOCUMENTS

| | | |
|---|---|---|
| CN | 104065798 A | 9/2014 |
| CN | 104660782 A | 5/2015 |
| CN | 106653041 A | 1/2017 |
| CN | 106653041 A | 5/2017 |
| CN | 107336674 A | 11/2017 |
| CN | 107820163 A | 3/2018 |
| CN | 107933434 A | 4/2018 |
| CN | 109300475 A | 2/2019 |
| CN | 109493876 A | 3/2019 |
| CN | 109501672 A | 3/2019 |
| CN | 109887500 A | 6/2019 |
| EP | 1078818 A2 | 2/2001 |
| EP | 2291001 A1 | 3/2011 |
| JP | 2005303636 A | 10/2005 |
| JP | 2007336211 A | 12/2007 |
| JP | 2010010749 A | 1/2010 |
| JP | 2016203910 A | 12/2016 |
| JP | 2016225884 A | 12/2016 |
| JP | 2018180424 A | 11/2018 |
| KR | 20090132819 A | 12/2009 |
| WO | 2013153583 A1 | 10/2013 |
| WO | 2016183791 A1 | 11/2016 |

OTHER PUBLICATIONS

Office Action, CN Application No. 202010479034.9, dated Apr. 23, 2021, 3 pages.
Fourth Office Action for CN202010479034.9, dated Jun. 8, 2022, 12 pages.
Extended European Search Report Issued in European Patent Application No. 21163590.9, dated Sep. 13, 2021, 6 Pages.
Office Action, Japan Patent Office, Application No. 2020-211915, dated Oct. 3, 2018, 5 pages.
Chinese Second Office Action for App. No. 202010479034.9 dated Dec. 3, 2021, 11 pages.
Chinese Third Office Action for App. No. 202010479034.9 dated Mar. 3, 2022, 11 pages.
Fifth Office Action for App. No. 202010479034.9 dated Aug. 19, 2022, 11 pages.
Notice of Allowance for JP2020-211915, dated Oct. 18, 2022, 3 pgs.

* cited by examiner

VOICE PICKUP METHOD FOR INTELLIGENT REARVIEW MIRROR, ELECTRONIC DEVICE AND STORAGE MEDIUM

The present application claims the priority and benefit of Chinese Patent Application No. 202010479034.9, filed on May 29, 2020, entitled "VOICE PICKUP METHOD AND APPARATUS OF INTELLIGENT REARVIEW MIRROR". The disclosure of the above application is incorporated herein by reference in its entirety.

TECHNICAL FIELD

The present application relates to the technical field of automobiles, and particularly to a voice pickup method and apparatus for an intelligent rearview mirror, an electronic device and a computer readable storage medium in the technical field of vehicle-mounted equipment.

BACKGROUND

With the development of science and technology, a vehicle may be provided with a plurality of intelligent devices, such as an intelligent rearview mirror. The existing intelligent rearview mirror has various functions, such as voice interaction, electronic navigation, GPS positioning, video and audio entertainment, or the like.

In order to guarantee the driving safety of the vehicle and avoid accidents caused by manual operation of the intelligent rearview mirror, a user in the vehicle usually uses voices to interact with the intelligent rearview mirror. Therefore, the accuracy of a voice signal of the user picked up by the intelligent rearview mirror may directly influence the effect of voice interaction between the intelligent rearview mirror and the user. If the voice signal of the user is unable to be picked up accurately, the intelligent rearview mirror is unable to smoothly complete the voice interaction with the user, and the driving safety of the vehicle may also be influenced.

SUMMARY

According to some embodiments, a voice pickup method of an intelligent rearview mirror, including: acquiring an image of an interior of a vehicle; determining a position of a person in the vehicle with the image of the interior of the vehicle; and adjusting a beamforming direction of a microphone array according to the position of the person in the vehicle.

According to some embodiments, a voice pickup apparatus of an intelligent rearview mirror, including: an acquiring unit configured to acquire an image of an interior of a vehicle; a determining unit configured to determine a position of a person in the vehicle with the image of the interior of the vehicle; and an adjusting unit configured to adjust a beamforming direction of a microphone array according to the position of the person in the vehicle.

BRIEF DESCRIPTION OF THE DRAWINGS

The drawings are used for better understanding the present solution and do not constitute a limitation of the present application. In the drawings.

DETAILED DESCRIPTION OF EMBODIMENTS

The following part will illustrate exemplary embodiments of the present application with reference to the figures, including various details of the embodiments of the present application for a better understanding. The embodiments should be regarded only as exemplary ones. Therefore, those skilled in the art should appreciate that various changes or modifications can be made with respect the embodiments described herein without departing from the scope and spirit of the present application. Similarly, for clarity and conciseness, the descriptions of the known functions and structures are omitted in the descriptions below.

Figure 1:
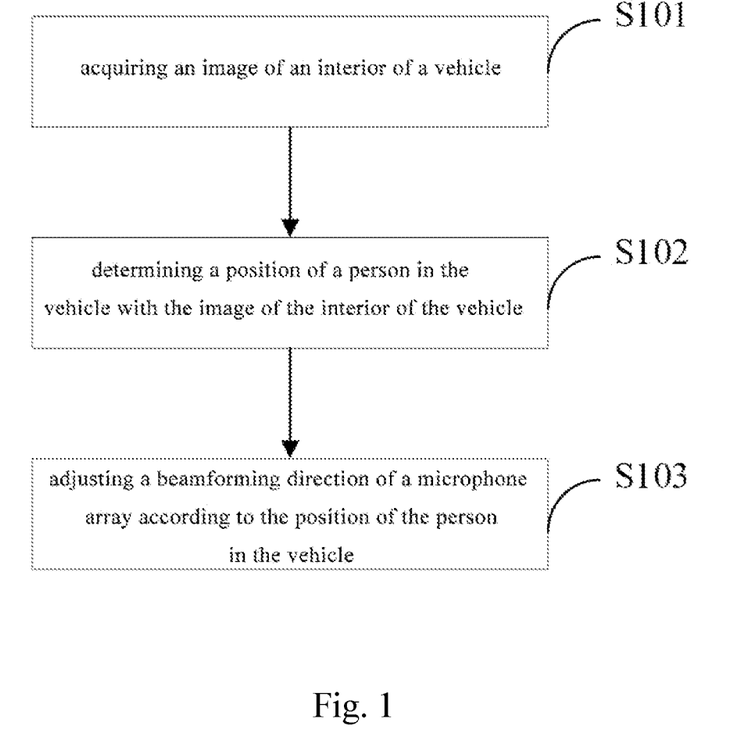
FIG. 1 is a schematic diagram according to a first embodiment of the present application.

FIG. 1 is a schematic diagram according to a first embodiment of the present application. As shown in FIG. 1, a voice pickup method implemented by an intelligent rearview mirror according to this embodiment may include the following steps:

S101: acquiring an image of an interior of a vehicle;

S102: determining a position of a person in the vehicle with the image of the interior of the vehicle; and S103: adjusting a beamforming direction of a microphone array according to the position of the person in the vehicle.

In this embodiment, the intelligent rearview mirror serves as the execution subject for voice pickup, and after determining the position of the person in the vehicle according to the image of the interior of the vehicle, adjusts the beamforming direction of the microphone array according to the determined position of the person in the vehicle, thereby controlling the microphone array to form a beam directed to the person in the vehicle for voice pickup, such that the beamforming direction of the microphone array corresponds to the position of the person in the vehicle, and only a voice signal in the formed beam is picked up.

The beam formed by the microphone array in this embodiment is a cone-shaped narrow beam, and is directed to a sound source of a speaker for picking up the voice signal, such that the microphone array may suppress noises in the environment while receiving the voices of the speaker. Therefore, in this embodiment, the beamforming direction of the microphone array is adjusted to direct the beam formed by the microphone array only to the person currently in the vehicle instead of other positions, thus avoiding the situation that the microphone array may receive the noises in directions without persons due to responses to the voice signals in plural directions, further improving the accuracy of the voices which are picked up, and enhancing suppression on the noises.

The intelligent rearview mirror in this embodiment is mounted in a vehicle, has an independent operating system and an independent running space, may have application programs, such as social contact, games, navigation, audios and videos, or the like, installed by a user, may be connected with the network through WIFI or a mobile communication network, and provides safety and entertainment functions in the driving process of the vehicle, such as voice interaction, navigation, overspeed reminding, driving recording, real-time online audios and videos, or the like.

The microphone array in this embodiment is composed of a certain number of acoustic sensors (generally microphones), configured as a system for sampling and processing spatial characteristics of a sound field, located in the intelligent rearview mirror, and configured to pick up the voice signal sent by the person in the vehicle, such that the intelligent rearview mirror completes voice interaction with the person in the vehicle.

When the intelligent rearview mirror in this embodiment executes the S101 of acquiring the image of the interior of the vehicle, the image of the interior of the vehicle may be shot by a camera of the intelligent rearview mirror; or after the person in the vehicle shoots the image of the interior of the vehicle using a terminal device of the person in the vehicle, the shot image of the interior of the vehicle is sent to the intelligent rearview mirror. The way of acquiring the image of the interior of the vehicle by the intelligent rearview mirror is not limited in the present application.

It may be understood that the intelligent rearview mirror in this embodiment may perform the operation of acquiring the image of the interior of the vehicle when the vehicle is started or when the person in the vehicle issues an acquisition instruction.

The position of the person in the vehicle determined with the image of the interior of the vehicle by the intelligent rearview mirror in this embodiment includes a driving position, a co-driving position or a rear row position of the person in the vehicle. When the intelligent rearview mirror in this embodiment determines the position of the person in the vehicle with the image of the interior of the vehicle, the image of the interior of the vehicle may be analyzed with the processing capacity of the intelligent rearview mirror to determine the position of the person in the vehicle, or sent to the server side by the intelligent rearview mirror, and then, the position of the person in the vehicle returned by the server side is acquired.

Specifically, the intelligent rearview mirror in this embodiment may execute the S102 of determining the position of the person in the vehicle by: detecting whether a person exists at a preset position in the vehicle with the image of the interior of the vehicle, the preset position including at least one of the driving position, the co-driving position and the rear row position in the vehicle; and acquiring the position of the person in the vehicle according to the result of person detection for the preset position. In this embodiment, when the position of the person in the vehicle is determined according to the result of person detection for the preset position in the vehicle, irrelevant positions in the image of the interior of the vehicle may be prevented from being additionally detected, thereby improving the detection accuracy and the detection speed of the position of the person in the vehicle.

In this embodiment, after determining the position of the person in the vehicle, the intelligent rearview mirror adjusts the beamforming direction of the microphone array, such that the direction of the beam formed by the microphone array corresponds to the determined position of the person in the vehicle, thereby picking up the voice signal in the beam directed to the person in the vehicle, so as to achieve the purposes of extracting the sound source while suppressing the noises.

For example, if the determined position of the person in the vehicle is the driving position, the direction of the beam formed by the microphone array is adjusted to be directed to the driving position, thereby picking up the voice signal sent from the driving position; if the determined positions of the persons in the vehicle are the driving position and the rear row position, the directions of the wave beams formed by the microphone array are adjusted to be directed to the driving position and the rear row position respectively, thereby picking up the voice signals sent from the driving position and the rear row position.

Specifically, the intelligent rearview mirror in this embodiment may perform the S103 of adjusting the beamforming direction of the microphone array according to the determined position of the person in the vehicle by: acquiring an adjustment scheme corresponding to the determined position of the person in the vehicle; and adjusting the beamforming direction of the microphone array using the acquired adjustment scheme. When the intelligent rearview mirror acquires the adjustment scheme corresponding to the determined position of the person in the vehicle, the adjustment scheme pre-stored locally may be acquired; or the intelligent rearview mirror may send the determined position of the person in the vehicle to the server side and then receive the adjustment scheme returned by the server side.

In addition, the step that the intelligent rearview mirror in this embodiment adjusts the beamforming direction of the microphone array according to the determined position of the person in the vehicle may further include: determining a microphone in the microphone array corresponding to the determined position of the person in the vehicle; and adjusting the beamforming direction of the microphone array using the determined microphone, and turning off remaining microphones in the microphone array.

That is, in this embodiment, when the beamforming direction of the microphone array is adjusted using the adjustment scheme, each microphone in the microphone array may be configured flexibly, thereby using only part of the microphones in the microphone array, avoiding the problem that excessive CPU resources of the intelligent rearview mirror are occupied when all the microphones are turned on, and effectively improving the utilization efficiency of the CPU resources.

Figure 2:
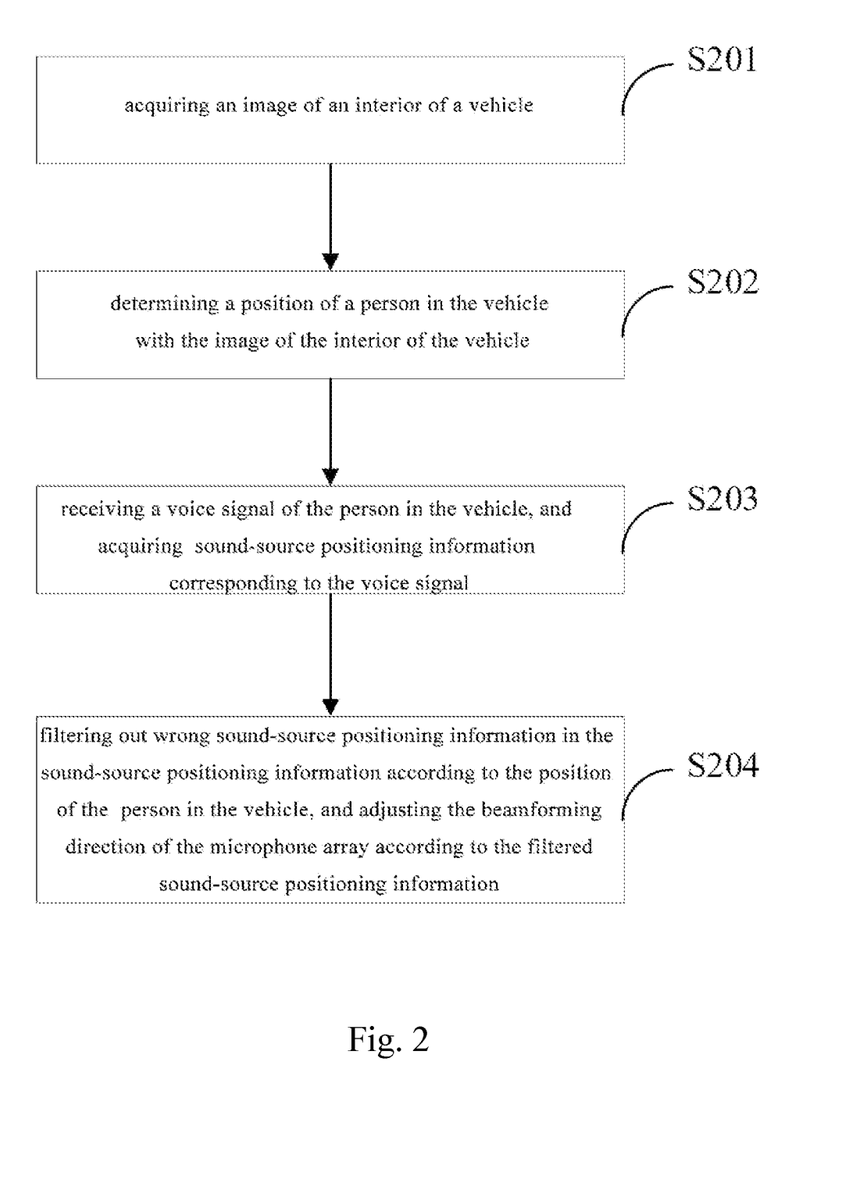
FIG. 2 is a schematic diagram according to a second embodiment of the present application.

For example, if the determined position of the person in the vehicle is the driving position, that is, the person in the vehicle is located at the right side of the intelligent rearview mirror, when adjusted using the acquired adjustment scheme in this embodiment, the beamforming direction of the microphone array may be adjusted only using the microphone located at the right side of the microphone array, so as to direct the formed beam to the driving position, and the microphone located at the left side of the microphone array is turned off. FIG. 2 is a schematic diagram according to a second embodiment of the present application. As shown in FIG. 2, a voice pickup method implemented by an intelligent rearview mirror according to this embodiment may include the following steps:

S201: acquiring an image of an interior of a vehicle; S202: determining a position of a person in the vehicle with the image of the interior of the vehicle; and S203: receiving a voice signal of the person in the vehicle, and acquiring sound-source positioning information corresponding to the voice signal.

In this embodiment, the intelligent rearview mirror first receives the voice signal sent by a user in a vehicle by the microphone array, and then acquires the sound-source positioning information corresponding to the received voice signal with a sound-source positioning algorithm preset in the microphone array.

S204: filtering out wrong sound-source positioning information in the sound-source positioning information according to the position of the person in the vehicle, and adjusting the beamforming direction of the microphone array according to the filtered sound-source positioning information.

When a sound source is positioned utilizing the voice signal, the microphone array tends to be influenced by noises to cause an error in the sound-source positioning process, thereby influencing the accuracy of voices picked up by the microphone array. Therefore, in this embodiment, after the sound-source positioning information is acquired, the wrong sound-source positioning information in the sound-source positioning information is first filtered out using the determined position of the person in the vehicle, only the sound-source positioning information corresponding to the position of the person in the vehicle in the sound-source positioning information is retained, and then, the beamforming direction of the microphone array is adjusted using the filtered sound-source positioning information.

That is, in the second embodiment of the present application, the beamforming direction of the microphone array is adjusted with both the voice signal and the position of the person in the vehicle, and since multi-dimensional information is used during adjustment, the sound-source positioning error of the microphone array caused by only using the sound-source positioning information is avoided, and the accuracy of the voices picked up by the microphone array is further improved.

For example, if the sound-source positioning information acquired according to the voice signal of the person in the vehicle indicates the driving position and the co-driving position, and the position of the person in the vehicle determined according to the image of the interior of the vehicle is only the driving position, in this embodiment, the sound-source positioning information corresponding to the co-driving position is filtered out, and the beamforming direction of the microphone array is adjusted based on the sound-source positioning information of the driving position.

Figure 3:
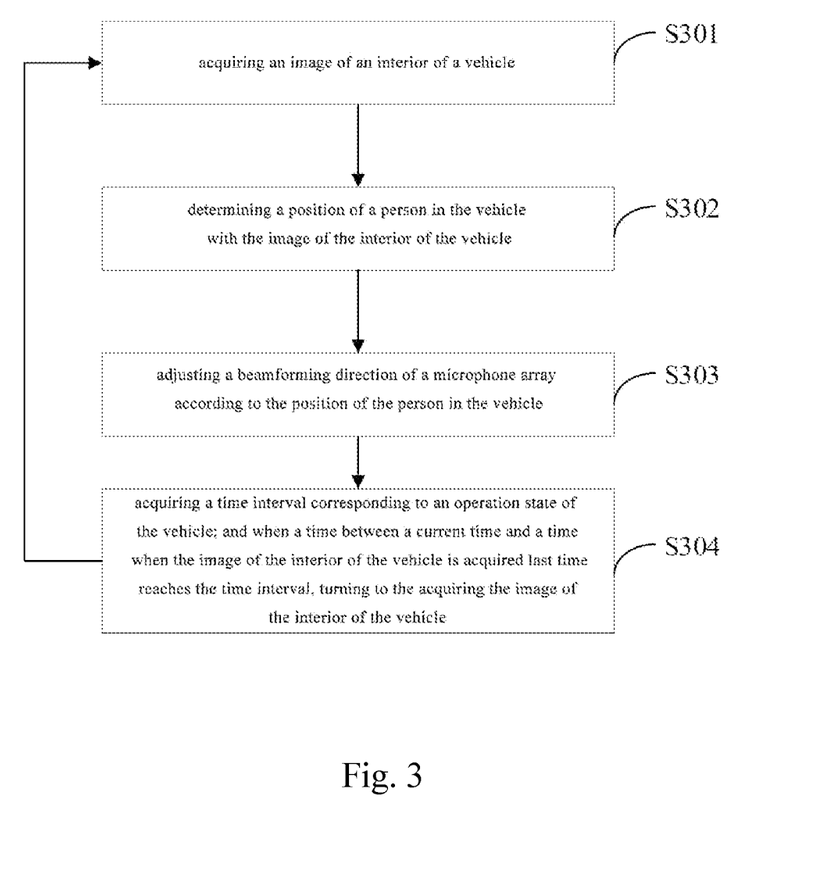
FIG. 3 is a schematic diagram according to a third embodiment of the present application.

FIG. 3 is a schematic diagram according to a third embodiment of the present application. As shown in FIG. 3, a voice pickup method implemented by an intelligent rearview mirror according to this embodiment may include the following steps:

S301: acquiring an image of an interior of a vehicle;

S302: determining a position of a person in the vehicle with the image of the interior of the vehicle;

S303: adjusting a beamforming direction of a microphone array according to the position of the person in the vehicle; and S304: acquiring a time interval corresponding to an operation state of a vehicle, and when a time between a current time and a time when the image of the interior of the vehicle is acquired last time reaches the time interval, turning to the step of acquiring the image of the interior of the vehicle, so as to repeat the steps of S301~S303.

After the beamforming direction of the microphone array is adjusted according to the position of the person in the vehicle, in order to ensure that the microphone array may pick up the voices accurately when the position of the person in the vehicle is changed, in this embodiment, the time interval corresponding to the operation state of the vehicle is first acquired, and then, when the time between the current time and the time when the image of the interior of the vehicle is acquired last time reaches the time interval, the step S301 is executed to re-acquire the image of the interior of the vehicle, and the beamforming direction of the microphone array is adjusted based on the re-acquired vehicle image, and so on.

It may be understood that, in this embodiment, the time interval corresponding to the operation state of the vehicle may be uniformly set for different operation states of the vehicle, and for example, a 30-minute time interval is uniformly set for the vehicle travelling state and the vehicle stationary state. In this embodiment, since the distribution of the person in the vehicle basically does not change after the vehicle is started and is travelling, a longer time interval may be set for the vehicle travelling state; since the person in the vehicle tends to change when the vehicle is stationary, a shorter time interval may be set for the vehicle stationary state.

For example, if the vehicle is in the travelling state, the corresponding time interval is 30 minutes, and the time between the current time and the time when the image of the interior of the vehicle is acquired last time reaches 30 minutes, the image of the interior of the vehicle is re-acquired, and the current position of the person in the vehicle is determined with the image of the interior of the vehicle; if the current position of the person in the vehicle is the same as the last position of the person in the vehicle, the microphone array is not required to be adjusted, otherwise, the beamforming direction of the microphone array is adjusted according to the current position of the person in the vehicle.

Figure 4:
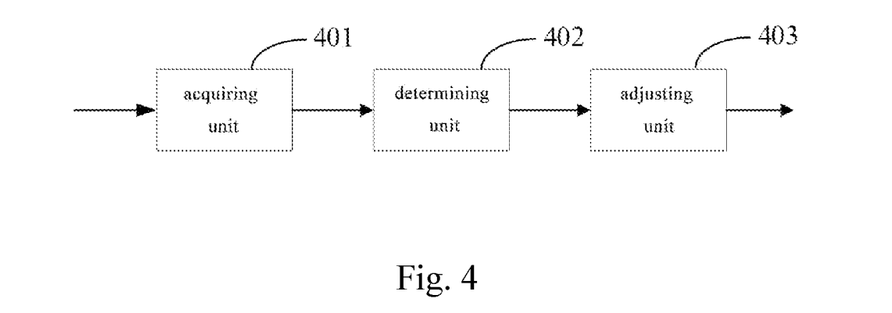
FIG. 4 is a schematic diagram according to a fourth embodiment of the present application.

FIG. 4 is a schematic diagram according to a fourth embodiment of the present application. As shown in FIG. 4, a voice pickup apparatus for an intelligent rearview mirror according to this embodiment is located in the intelligent rearview mirror and includes:

an acquiring unit 401 configured to acquire an image of an interior of a vehicle;

a determining unit 402 configured to determine a position of a person in the vehicle with the image of the interior of the vehicle; and an adjusting unit 403 configured to adjust a beamforming direction of a microphone array according to the position of the person in the vehicle.

When the acquiring unit 401 in this embodiment acquires the image of the interior of the vehicle, the image of the interior of the vehicle may be shot by a camera of the intelligent rearview mirror; or after the person in the vehicle shoots the image of the interior of the vehicle using a terminal device of the person in the vehicle, the shot image of the interior of the vehicle is sent to the intelligent rearview mirror. The way of acquiring the image of the interior of the vehicle by the intelligent rearview mirror is not limited in the present application.

It may be understood that the acquiring unit 401 in this embodiment may perform the operation of acquiring the image of the interior of the vehicle when the vehicle is started or when the person in the vehicle issues an acquisition instruction.

The position of the person in the vehicle determined with the image of the interior of the vehicle by the determining unit 402 in this embodiment includes a driving position, a co-driving position or a rear row position of the person in the vehicle. When the determining unit 402 in this embodiment determines the position of the person in the vehicle with the image of the interior of the vehicle, the image of the interior of the vehicle may be analyzed with the processing capacity of the intelligent rearview mirror to determine the position of the person in the vehicle, or sent to the server side by the intelligent rearview mirror, and then, the position of the person in the vehicle returned by the server side is acquired.

Specifically, the determining unit 402 in this embodiment may determine the position of the person in the vehicle by:

detecting whether a person exists at a preset position in the vehicle with the image of the interior of the vehicle, the preset position including at least one of the driving position, the co-driving position and the rear row position in the vehicle; and acquiring the position of the person in the vehicle according to the result of person detection for the preset position. When the determining unit 402 in this embodiment determines the position of the person in the vehicle according to the result of person detection for the preset position in the vehicle, irrelevant positions in the image of the interior of the vehicle may be prevented from being additionally detected, thereby improving the detection accuracy and the detection speed of the position of the person in the vehicle.

In this embodiment, after the determining unit 402 determines the position of the person in the vehicle, the adjusting unit 403 adjusts the beamforming direction of the microphone array according to the determined position of the person in the vehicle, such that the direction of the beam formed by the microphone array corresponds to the determined position of the person in the vehicle, thereby only picking up the voice signal in each beam, so as to achieve the purposes of extracting the sound source while suppressing the noises.

Optionally, the adjusting unit 403 in this embodiment may adjust the beamforming direction of the microphone array according to the determined position of the person in the vehicle by: acquiring an adjustment scheme corresponding to the determined position of the person in the vehicle; and adjusting the beamforming direction of the microphone array using the acquired adjustment scheme. When the adjusting unit 403 acquires the adjustment scheme corresponding to the determined position of the person in the vehicle, the adjustment scheme pre-stored locally may be acquired; or the adjusting unit 403 may send the determined position of the person in the vehicle to the server side and then receive the adjustment scheme returned by the server side.

Optionally, the adjusting unit 403 in this embodiment may adjust the beamforming direction of the microphone array according to the determined position of the person in the vehicle further by: determining a microphone in the microphone array corresponding to the determined position of the person in the vehicle; and adjusting the beamforming direction of the microphone array using the determined microphone, and turning off remaining microphones in the microphone array.

That is, when the adjusting unit 403 adjusts the beamforming direction of the microphone array using the adjustment scheme, each microphone in the microphone array may be configured flexibly, thereby using only part of the microphones in the microphone array, avoiding the problem that excessive CPU resources of the intelligent rearview mirror are occupied when all the microphones are turned on, and effectively improving the utilization efficiency of the CPU resources.

Optionally, the adjusting unit 403 may adjust the beamforming direction of the microphone array according to the determined position of the person in the vehicle further by: receiving the voice signal of the person in the vehicle, and acquiring sound-source positioning information corresponding to the voice signal; filtering out wrong sound-source positioning information in the sound-source positioning information according to the position of the person in the vehicle, and adjusting the beamforming direction of the microphone array according to the filtered sound-source positioning information.

The adjusting unit 403 first receives the voice signal sent by a user in a vehicle by the microphone array, and then acquires the sound-source positioning information corresponding to the received voice signal with a sound-source positioning algorithm preset in the microphone array.

When a sound source is positioned utilizing the voice signal, the microphone array tends to be influenced by noises to cause an error in the sound-source positioning process, thereby influencing the accuracy of voices picked up by the microphone array. Therefore, after acquiring the sound-source positioning information, the adjusting unit 403 first filters out the wrong sound-source positioning information in the sound-source positioning information using the determined position of the person in the vehicle, so as to only retain the sound-source positioning information corresponding to the position of the person in the vehicle in the sound-source positioning information, and then adjusts the beamforming direction of the microphone array using the filtered sound-source positioning information.

That is, the adjusting unit 403 adjusts the beamforming direction of the microphone array with the voice signal and the position of the person in the vehicle, and since multi-dimensional information is used during adjustment, the sound-source positioning error of the microphone array caused by only using the sound-source positioning information is avoided, and the accuracy of the voices picked up by the microphone array is further improved.

Optionally, after adjusting the beamforming direction of the microphone array according to the position of the person in the vehicle, the adjusting unit 403 may further acquire a time interval corresponding to the operation state of a vehicle, and when the time between the current time and the time when the image of the interior of the vehicle is acquired last time reaches the time interval, turn to the acquiring unit 401 to execute the step of acquiring the image of the interior of the vehicle, so as to repeat the image acquirement by the acquiring unit, the position determination by the determining unit and the beamforming direction adjustment by the adjusting unit.

It may be understood that the time interval in the adjusting unit 403 corresponding to the operation state of the vehicle may be uniformly set for different operation states of the vehicle. Since the distribution of the person in the vehicle basically does not change after the vehicle is started and is travelling, the adjusting unit 403 may set a longer time interval for the vehicle travelling state; since the person in the vehicle tends to change when the vehicle is stationary, the adjusting unit 403 may set a shorter time interval for the vehicle stationary state.

According to the embodiments of the present application, there are also provided an electronic device and a computer readable storage medium.

Figure 5:
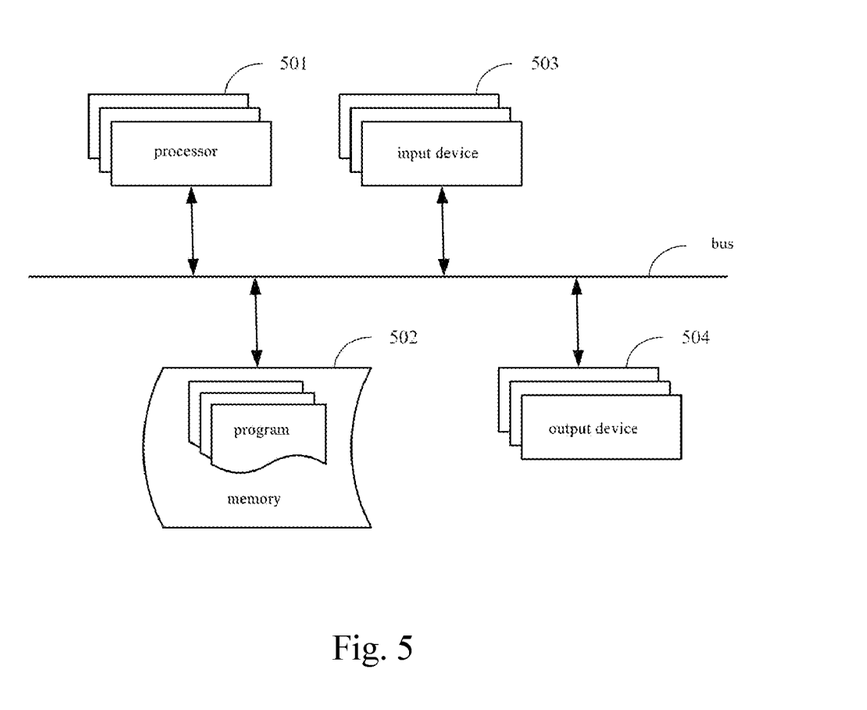
FIG. 5 is a block diagram of an electronic device configured to implement a voice pickup method of an intelligent rearview mirror according to the embodiments of the present application.

FIG. 5 is a block diagram of an electronic device configured to implement the voice pickup method of an intelligent rearview mirror according to the embodiments of the present application. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present application described and/or claimed herein.

As shown in FIG. 5, the electronic device includes one or more processors 501, a memory 502, and interfaces configured to connect the various components, including high-speed interfaces and low-speed interfaces. The various components are interconnected using different buses and may be mounted at a common motherboard or in other manners as desired. The processor may process instructions for execution within the electronic device, including instructions stored in or at the memory to display graphical information for a GUI at an external input/output device, such as a display device coupled to the interface. In other implementations, plural processors and/or plural buses may be used with plural memories, if desired. Also, plural electronic devices may be connected, with each device providing some of necessary operations (for example, as a server array, a group of blade servers, or a multi-processor system). In FIG. 5, one processor 501 is taken as an example.

The memory 502 is configured as the non-transitory computer readable storage medium according to the present application. The memory stores instructions executable by the at least one processor to cause the at least one processor to perform a voice pickup method of an intelligent rearview mirror according to the present application. The non-transitory computer readable storage medium according to the present application stores computer instructions for causing a computer to perform the voice pickup method of the intelligent rearview mirror according to the present application.

The memory 502 which is a non-transitory computer readable storage medium may be configured to store non-transitory software programs, non-transitory computer executable programs and modules, such as program instructions/modules corresponding to the voice pickup method of the intelligent rearview mirror according to the embodiments of the present application (for example, the acquiring unit 401, the determining unit 402 and the adjusting unit 403 shown in FIG. 4). The processor 501 executes various functional applications and data processing of a server, that is, implements the voice pickup method of the intelligent rearview mirror according to the above-mentioned embodiments, by running the non-transitory software programs, instructions, and modules stored in the memory 502.

The memory 502 may include a program storage area and a data storage area, wherein the program storage area may store an operating system and an application program required for at least one function; the data storage area may store data created according to use of the electronic device, or the like. Furthermore, the memory 502 may include a high-speed random access memory, or a non-transitory memory, such as at least one magnetic disk storage device, a flash memory device, or other non-transitory solid state storage devices. In some embodiments, optionally, the memory 502 may include memories remote from the processor 501, and such remote memories may be connected to the electronic device for the voice pickup method of the intelligent rearview mirror. Examples of such a network include, but are not limited to, the Internet, intranets, local area networks, mobile communication networks, and combinations thereof.

The electronic device for the voice pickup method of the intelligent rearview mirror may further include an input device 503 and an output device 504. The processor 501, the memory 502, the input device 503 and the output device 504 may be connected by a bus or other means, and FIG. 5 takes the connection by a bus as an example.

The input device 503 may receive input numeric or character information and generate key signal input related to user settings and function control of the electronic device for the voice pickup method of the intelligent rearview mirror, such as a touch screen, a keypad, a mouse, a track pad, a touch pad, a pointing stick, one or more mouse buttons, a trackball, a joystick, or the like. The output device 504 may include a display device, an auxiliary lighting apparatus (for example, an LED) and a tactile feedback apparatus (for example, a vibrating motor), or the like. The display device may include, but is not limited to, a liquid crystal display (LCD), a light emitting diode (LED) display, and a plasma display. In some implementations, the display device may be a touch screen.

Various implementations of the systems and technologies described here may be implemented in digital electronic circuitry, integrated circuitry, ASICs (application specific integrated circuits), computer hardware, firmware, software, and/or combinations thereof. These various implementations may be implemented in one or more computer programs which are executable and/or interpretable on a programmable system including at least one programmable processor, and the programmable processor may be special or general, and may receive data and instructions from, and transmitting data and instructions to, a storage system, at least one input device, and at least one output device.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer readable medium" refer to any computer program product, device and/or apparatus (for example, magnetic discs, optical disks, memories, programmable logic devices (PLDs)) for providing machine instructions and/or data to a programmable processor, including a machine readable medium which receives machine instructions as a machine readable signal. The term "machine readable signal" refers to any signal for providing machine instructions and/or data to a programmable processor.

To provide interaction with a user, the systems and technologies described here may be implemented on a computer having: a display apparatus (for example, a CRT (cathode ray tube) or LCD (liquid crystal display) monitor) for displaying information to a user; and a keyboard and a pointing apparatus (for example, a mouse or a trackball) by which a user may provide input to the computer. Other kinds of apparatuses may also be used to provide interaction with a user; for example, feedback provided to a user may be any form of sensory feedback (for example, visual feedback, auditory feedback, or tactile feedback); and input from a user may be received in any form (including acoustic, voice or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network).

Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which are run on respective computers and have a client-server relationship to each other.

With the technical solution of the embodiments of the present application, the intelligent rearview mirror determines the position of the person in the vehicle with the image of the interior of the vehicle and then adjusts the beamforming direction of the microphone array according to the position of the person in the vehicle, thus solving the technical problem that voices picked up by a microphone array in an intelligent rearview mirror in the prior art are inaccurate due to voice pickup according to uniform setting regardless of the condition in a vehicle, thereby improving the accuracy of the voices picked up by the intelligent rearview mirror.

It should be understood that various forms of the flows shown above may be used and reordered, and steps may be added or deleted. For example, the steps described in the present application may be executed in parallel, sequentially, or in different orders, and are not limited herein as long as the desired results of the technical solution disclosed in the present application may be achieved.

The above-mentioned embodiments are not intended to limit the scope of the present application. It should be understood by those skilled in the art that various modifications, combinations, sub-combinations and substitutions may be made, depending on design requirements and other factors. Any modification, equivalent substitution and improvement made within the spirit and principle of the present application all should be included in the extent of protection of the present application.

What is claimed is:

1. A voice pickup method implemented by an intelligent rearview mirror, comprising:
    acquiring an image of an interior of a vehicle;
    determining a position of a person in the vehicle with the image of the interior of the vehicle;
    adjusting a beamforming direction of a microphone array according to the position of the person in the vehicle;
    acquiring a time interval corresponding to an operation state of the vehicle; and
    when a time between a current time and a time when the image of the interior of the vehicle is acquired last time reaches the time interval, turning to the acquiring the image of the interior of the vehicle, so as to repeat the actions of image acquirement, position determination and beamforming direction adjustment,
    wherein the operation state of the vehicle comprises a vehicle travelling state and a vehicle stationary state, and the time interval corresponding to the vehicle travelling state is longer than the time interval corresponding to the vehicle stationary state.

2. The method according to claim 1, wherein the determining the position of the person in the vehicle with the image of the interior of the vehicle comprises:
    detecting whether a person exists at a preset position in the vehicle with the image of the interior of the vehicle; and
    acquiring the position of the person in the vehicle according to the result of person detection for the preset position.

3. The method according to claim 1, wherein the adjusting the beamforming direction of the microphone array according to the position of the person in the vehicle comprises:
    determining a microphone in the microphone array corresponding to the position of the person in the vehicle; and
    adjusting the beamforming direction of the microphone array using the microphone determined, and turning off remaining microphones in the microphone array.

4. The method according to claim 1, wherein the adjusting the beamforming direction of the microphone array according to the position of the person in the vehicle comprises:
    receiving a voice signal of the person in the vehicle, and acquiring sound-source positioning information corresponding to the voice signal; and
    filtering out wrong sound-source positioning information in the sound-source positioning information according to the position of the person in the vehicle, and adjusting the beamforming direction of the microphone array according to the filtered sound-source positioning information.

5. An electronic device used for an intelligent rearview mirror, comprising:
    at least one processor; and
    a memory connected with the at least one processor communicatively;
    wherein the memory stores instructions executable by the at least one processor to cause the at least one processor to perform a voice pickup method which comprises:
    acquiring an image of an interior of a vehicle;
    determining a position of a person in the vehicle with the image of the interior of the vehicle;
    adjusting a beamforming direction of a microphone array according to the position of the person in the vehicle;
    acquiring a time interval corresponding to an operation state of the vehicle; and
    when a time between a current time and a time when the image of the interior of the vehicle is acquired last time reaches the time interval, turning to the acquiring the image of the interior of the vehicle, so as to repeat the actions of image acquirement, position determination and beamforming direction adjustment,
    wherein the operation state of the vehicle comprises a vehicle travelling state and a vehicle stationary state, and the time interval corresponding to the vehicle travelling state is longer than the time interval corresponding to the vehicle stationary state.

6. The electronic device according to claim 5, wherein the determining the position of the person in the vehicle with the image of the interior of the vehicle comprises:
    detecting whether a person exists at a preset position in the vehicle with the image of the interior of the vehicle; and
    acquiring the position of the person in the vehicle according to the result of person detection for the preset position.

7. The electronic device according to claim 5, wherein the adjusting the beamforming direction of the microphone array according to the position of the person in the vehicle comprises:
    determining a microphone in the microphone array corresponding to the position of the person in the vehicle; and adjusting the beamforming direction of the microphone array using the microphone determined, and turning off remaining microphones in the microphone array.

8. The electronic device according to claim 5, wherein the adjusting the beamforming direction of the microphone array according to the position of the person in the vehicle comprises:
- receiving a voice signal of the person in the vehicle, and acquiring sound-source positioning information corresponding to the voice signal; and
- filtering out wrong sound-source positioning information in the sound-source positioning information according to the position of the person in the vehicle, and adjusting the beamforming direction of the microphone array according to the filtered sound-source positioning information.

9. A non-transitory computer readable storage medium comprising computer instructions, which, when executed by a computer, cause the computer to carry out a voice pickup method which comprises:
- acquiring an image of an interior of a vehicle;
- determining a position of a person in the vehicle with the image of the interior of the vehicle;
- adjusting a beamforming direction of a microphone array according to the position of the person in the vehicle;
- acquiring a time interval corresponding to an operation state of the vehicle; and
- when a time between a current time and a time when the image of the interior of the vehicle is acquired last time reaches the time interval, turning to the acquiring the image of the interior of the vehicle, so as to repeat the actions of image acquirement, position determination and beamforming direction adjustment,
- wherein the operation state of the vehicle comprises a vehicle travelling state and a vehicle stationary state, and the time interval corresponding to the vehicle travelling state is longer than the time interval corresponding to the vehicle stationary state.

10. The non-transitory computer readable storage medium according to claim 9, wherein the determining the position of the person in the vehicle with the image of the interior of the vehicle comprises:
- detecting whether a person exists at a preset position in the vehicle with the image of the interior of the vehicle; and
- acquiring the position of the person in the vehicle according to the result of person detection for the preset position.

11. The non-transitory computer readable storage medium according to claim 9, wherein the adjusting the beamforming direction of the microphone array according to the position of the person in the vehicle comprises:
- determining a microphone in the microphone array corresponding to the position of the person in the vehicle; and
- adjusting the beamforming direction of the microphone array using the microphone determined, and turning off remaining microphones in the microphone array.

12. The non-transitory computer readable storage medium according to claim 9, wherein the adjusting the beamforming direction of the microphone array according to the position of the person in the vehicle comprises:
- receiving a voice signal of the person in the vehicle, and acquiring sound-source positioning information corresponding to the voice signal; and
- filtering out wrong sound-source positioning information in the sound-source positioning information according to the position of the person in the vehicle, and adjusting the beamforming direction of the microphone array according to the filtered sound-source positioning information.

* * * * *